(12) United States Patent
Piskala

(10) Patent No.: US 12,444,412 B2
(45) Date of Patent: Oct. 14, 2025

(54) LARGE LANGUAGE MODEL (LLM)-BASED CORRECTION BASED ON A MULTI-TOOL PROMPT

(71) Applicant: Amazon Technologies, Inc., Seattle, WA (US)

(72) Inventor: Deepak Babu Rajaram Piskala, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 18/369,049

(22) Filed: Sep. 15, 2023

(65) Prior Publication Data

US 2025/0095641 A1   Mar. 20, 2025

(51) Int. Cl.
   *G10L 15/183*   (2013.01)
(52) U.S. Cl.
   CPC .................... *G10L 15/183* (2013.01)
(58) Field of Classification Search
   CPC ........ G06N 5/022; G06F 40/284; G06F 40/30
   See application file for complete search history.

(56) References Cited

U.S. PATENT DOCUMENTS

| | | | | |
|---|---|---|---|---|
| 6,266,664 B1 * | 7/2001 | Russell-Falla | ...... | G06F 16/9535 707/999.005 |
| 8,447,602 B2 * | 5/2013 | Bartosik | ............... | G06F 40/232 704/235 |
| 9,619,735 B1 * | 4/2017 | Lineback | ................. | G06N 3/08 |
| 10,565,498 B1 * | 2/2020 | Zhiyanov | ............... | G06N 3/045 |
| 10,853,579 B2 * | 12/2020 | Laxman | ................... | G06F 40/30 |
| 10,878,174 B1 * | 12/2020 | Vontobel | .......... | G06Q 10/06398 |

(Continued)

FOREIGN PATENT DOCUMENTS

| | | | | |
|---|---|---|---|---|
| AU | 2011255614 A1 * | 11/2012 | ....... | G06F 16/24578 |
| AU | 2014233517 A1 * | 9/2015 | ............. | G10L 15/22 |

(Continued)

OTHER PUBLICATIONS

Ma et al., "Can Generative Large Language Models Perform Asr Error Correction?", ALTA Institute, Machine Intelligence Lab, Department of Engineering, Sep. 29, 2023, 8 pages.

(Continued)

*Primary Examiner* — Mohammad K Islam
(74) *Attorney, Agent, or Firm* — Kilpatrick Townsend & Stockton LLP

(57) ABSTRACT

Techniques for large language model (LLM)-based correction based on a multi-tool prompt are described. In an example, a computer system receives, via a user interface, user input including user-provided information and indicating a request for a task to be performed on the user-provided information. The computer system generates, by using an LLM associated with a prompt, a first input to a first tool based on the user input. The prompt indicating a sequence of steps to perform for the task and tools available to the LLM. The first tool corresponds to a first step of the sequence of steps. The computer system determines, by using the LLM, a first output of the first tool in response to the first input and an update to the user-provided information based on the first output and a completion of the task. The computer system causes the user interface to present the update.

20 Claims, 8 Drawing Sheets

(56) References Cited

U.S. PATENT DOCUMENTS

| | | | |
|---|---|---|---|
| 11,106,690 B1* | 8/2021 | Dhillon | G06N 5/01 |
| 11,481,434 B1* | 10/2022 | Venti | G06F 40/30 |
| 11,532,301 B1* | 12/2022 | Hajebi | G06F 40/35 |
| 2003/0115191 A1* | 6/2003 | Copperman | G06F 16/90332 |
| | | | 707/E17.139 |
| 2012/0215776 A1* | 8/2012 | Guha | G06F 16/951 |
| | | | 707/E17.064 |
| 2015/0278341 A1* | 10/2015 | Shen | G06F 16/9538 |
| | | | 707/730 |
| 2016/0323398 A1* | 11/2016 | Guo | H04L 67/535 |
| 2017/0127016 A1* | 5/2017 | Yu | G06N 3/084 |
| 2017/0323636 A1* | 11/2017 | Xiao | G06N 3/044 |
| 2018/0077101 A1* | 3/2018 | Desouza Sana | G06Q 10/107 |
| 2019/0108228 A1* | 4/2019 | Zeng | G06F 16/24522 |
| 2020/0118544 A1* | 4/2020 | Lee | G10L 15/063 |
| 2020/0356653 A1* | 11/2020 | Cho | G06N 3/084 |
| 2021/0201351 A1* | 7/2021 | Nag | G06F 16/24534 |
| 2022/0366901 A1* | 11/2022 | Rathaur | G06F 16/245 |
| 2023/0134791 A1* | 5/2023 | Londeree | G06F 16/93 |
| | | | 706/50 |
| 2025/0086213 A1* | 3/2025 | Dilipkumar | G06F 16/24522 |

FOREIGN PATENT DOCUMENTS

| | | | | |
|---|---|---|---|---|
| AU | 2015210460 A1 | * | 9/2015 | G10L 15/183 |
| CN | 110998565 A | * | 4/2020 | G06N 3/08 |
| EP | 3514694 B1 | * | 12/2022 | G06F 40/253 |
| EP | 4312147 A2 | * | 1/2024 | G10L 15/197 |
| WO | WO-2013157603 A1 | * | 10/2013 | G06F 16/955 |
| WO | WO-2015039165 A1 | * | 3/2015 | G06F 16/24578 |
| WO | WO-2017160341 A1 | * | 9/2017 | G10L 15/22 |
| WO | WO-2021119064 A1 | * | 6/2021 | H04L 51/42 |
| WO | WO-2023017320 A1 | * | 2/2023 | G10L 15/22 |

OTHER PUBLICATIONS

Application No. PCT/US2024/046278, International Search Report and Written Opinion, Mailed on Dec. 11, 2024, 12 pages.

Yoon et al., "Adapting Text-based Dialogue State Tracker for Spoken Dialogues", Electronics Telecommunications Research Institute (ETRI), Aug. 29, 2023, 8 pages.

* cited by examiner

LARGE LANGUAGE MODEL (LLM)-BASED CORRECTION BASED ON A MULTI-TOOL PROMPT

BACKGROUND

As speech recognition technology improves, systems that employ such technology continue to proliferate. Such systems employ techniques to identify the words spoken by a human user based on qualities of a received audio input. Such systems can also employ techniques for understanding the spoken words. Speech recognition and natural language processing techniques may be referred to collectively or separately herein as speech processing. Speech processing may also involve converting a user's speech into text data which may then be provided to various text-based software applications.

BRIEF DESCRIPTION OF THE DRAWINGS

Various embodiments in accordance with the present disclosure will be described with reference to the drawings, in which.

DETAILED DESCRIPTION

Figure 1:
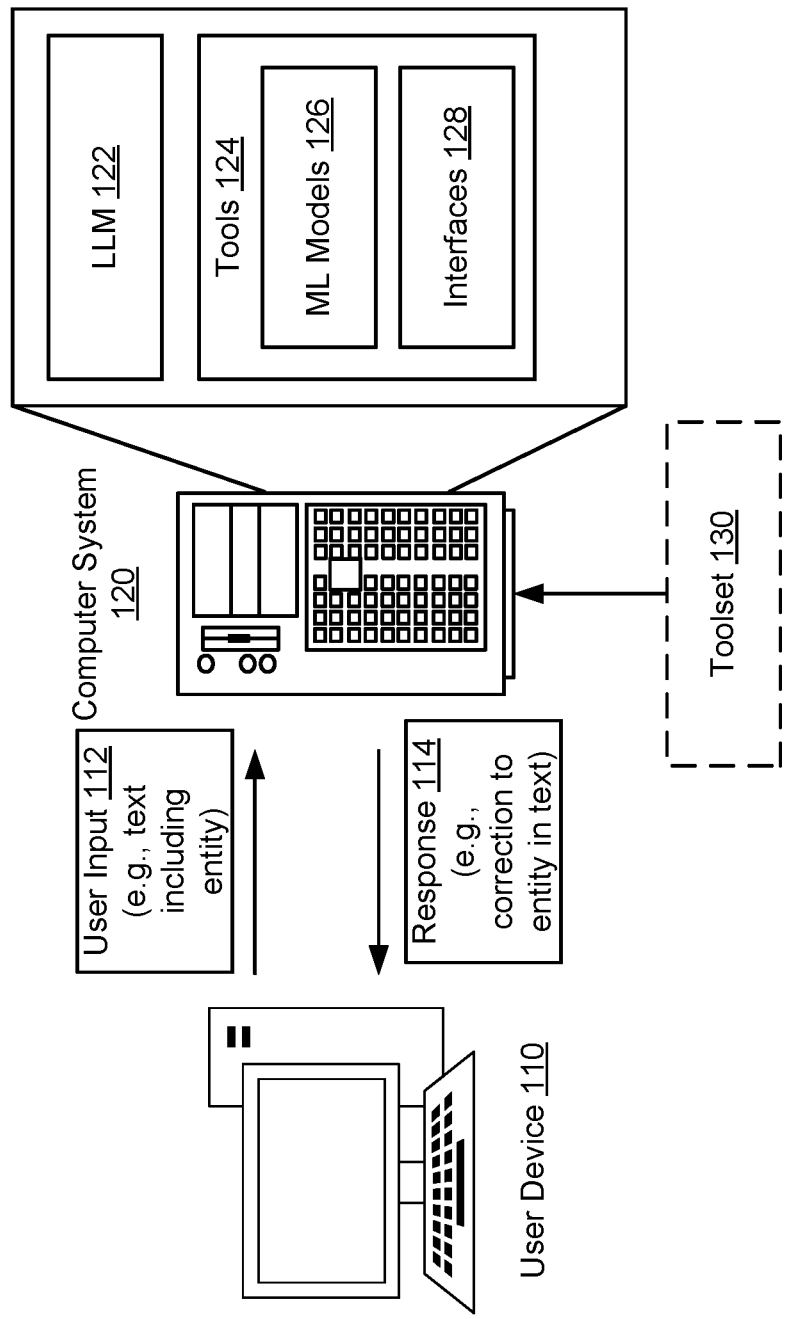
FIG. 1 illustrates an example of a system for large language model-based correction based on a multi-tool prompt in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, large language model (LLM)-based correction based on a multi-tool prompt. In an example, a system can receive, via a user interface, user input including user-provided information and indicating a request for a task to be performed on the user-provided information. For instance, the user-provided information may include text generated by an ASR process and the task may involve verifying an accuracy of the text. The system generates, by using an LLM associated with a prompt, inputs to different types of tools (e.g., machine learning models, search engines, and user interfaces) corresponding to various steps of the prompt. The output of one tool can be translated, by the LLM, into an input to another tool depending on the output (e.g., whether this output indicates that the task has been completed) and inter-dependencies between the steps as indicated by the prompt. The system determines, by using the LLM, output(s) of the tool(s) until determining that the task is complete. The completion of the task may result in the system determining an update to the user-provided information. The system can then cause the user interface to present the update, which can be used for downstream processing, such as by a voice recognition system or an online marketplace.

To illustrate, consider an example of collecting training data related to obtaining products from an online marketplace. A device that includes an audio sensor (e.g., a microphone) can detect an utterance of the user. The utterance can be processed by an ASR system, which can transcribe the utterance into text of "order righting pins". Before including such text in the training data, a verification process is executed. The verification process involves an LLM of the present disclosure. In particular, the text is received (e.g., based on user input via a user interface) by an LLM along with a request to perform a task of text verification on the text. So, the LLM, which is associated with a prompt defining a sequence of steps, tools, and execution formats for the steps for the task, can determine whether the text is correct or not. In particular, upon execution of a first step, the LLM can generate an input to an error correction model, which can generate an output indicating that the text has an error. Based on this output, the LLM can generate, upon an execution of a second step, another input to a search engine, which can generate an output indicating that the product included in the text should be "writing pens", not "righting pins". Accordingly, the LLM can determine that the task is complete and that the text is to be updated to "order writing pens". The updated text can be output to the user interface. Upon a confirmation via the user interface that the updated text is acceptable, this updated text can be added to the training data.

Embodiments of the present disclosure provide various technological advantages over conventional computer systems. For example, a conventional system may rely on manual correction for transcriptions output by ASR systems. The accuracy of such manual correction process may not meet a target accuracy. In addition, the manual correction process may not be scalable to handle a high volume of transcription verification at the target accuracy. As a result, any downstream computer system that relies on transcription (e.g., a machine learning model that is initially trained based on transcriptions) may not meet its target accuracy given the relatively limited scale up and quality of the transcription verification. In contrast, embodiments of the present disclosure leverage LLMs and prompts to generate accurate corrections to transcription errors and such LLM use can be highly scalable. As a result, the performance of the downstream computer systems can be improved. In addition, the LLMs may include memories so that repeat errors may be identified quickly without the LLM needing to reperform a task to determine the correction. Accordingly, the latency and resource requirements for determining corrections to transcriptions may be reduced.

FIG. 1 illustrates an example of a system for LLM-based correction based on a multi-tool prompt in accordance with an embodiment of the disclosure. A user device 110, which is illustrated as being a personal computer, but can be any suitable device such as a laptop, desktop, smartphone etc., sends a user input 112 to a computer system 120. The user input 112 is provided via a user interface of the user device 110. The user input 112 includes user-provided information and indicates a request for a task to be performed on the user-provided information. For instance, the user-provided information may be text or audio that an automatic speech recognition (ASR) model or a large language model (LLM) can convert to text, or can be an image, video, etc. In an example, the task may be text verification and correcting ASR annotations (e.g., by updating entity identifiers included in the text), completing a sentence, correcting color in an image, and the like. In addition, the task may be performed independent of user-provided information. For instance, the task may be to search the web using multiple search engines and summarizing the results of the search engines.

In the illustrated example of FIG. 1, the user input 112 includes text. This text includes an entity (e.g., an identifier of a product) among other pieces of information (e.g., an intent to obtain the product using a certain delivery method). The entity may be one of multiple predefined entities (e.g., a product available from a catalog of products offered through an online marketplace).

In an example, the computer system 120 hosts an LLM 122 associated with a prompt that indicates the sequence of steps to perform for the task, tools 124 available to the LLM 122, and an execution format for each step. The prompt may be defined for a standard operating procedure to perform the task. The sequence of steps may involve: step 1) checking whether the text of the user input 112 has a speech recognition error, step 2) finding corrections for the text even if there is a small chance of error, step 3) proceeding to step 7 if no entity identifier is included in the text, step 4) finding the entity mentioned in the text, step 5) converting the text to written form when required, step 6) determining corrections by looking up a search engine, step 7) considering all the prior results to return corrected text, step 8) if no correction is needed, proceed to step 10, step 9) ask if a user meant one of these similar sounding entities, and step 10) return a final correction considering user input and prior observations. Other steps or a different order of the steps are possible. The tools 124 can include machine learning (ML) models 126 and interfaces 128. The ML models 126 may include an error correction model, an error detection model, a written form generator, an entity extraction model, and a disambiguation model. In addition, the interfaces 128 may include interfaces to an external toolset 130. For instance, the interfaces 128 may be web interfaces for search engines or user interfaces for receiving user input. Although not shown in FIG. 1, the tools 124 may also include additional LLMs that inspect outputs of the LLM 122 and help the LLM 122 improve (e.g., audit LLMs that provide reinforcement learning to the LLM 122).

The LLM 122 uses various tools 124 to process the user input 112 and generate a response 114. In an example, the response 114 may include an update to the user-provided information, such as a correction to an entity identifier (e.g., product name) included in the user-provided information. The update may replace the words of the entity identifier, may suggest the determined entity identifier with other possible suggestions, or any other suitable action. Once the LLM 122 determines the task is complete, the computer system 120 can send the response 114 to the user device 110, which can present the update via the user interface.

Figure 2:
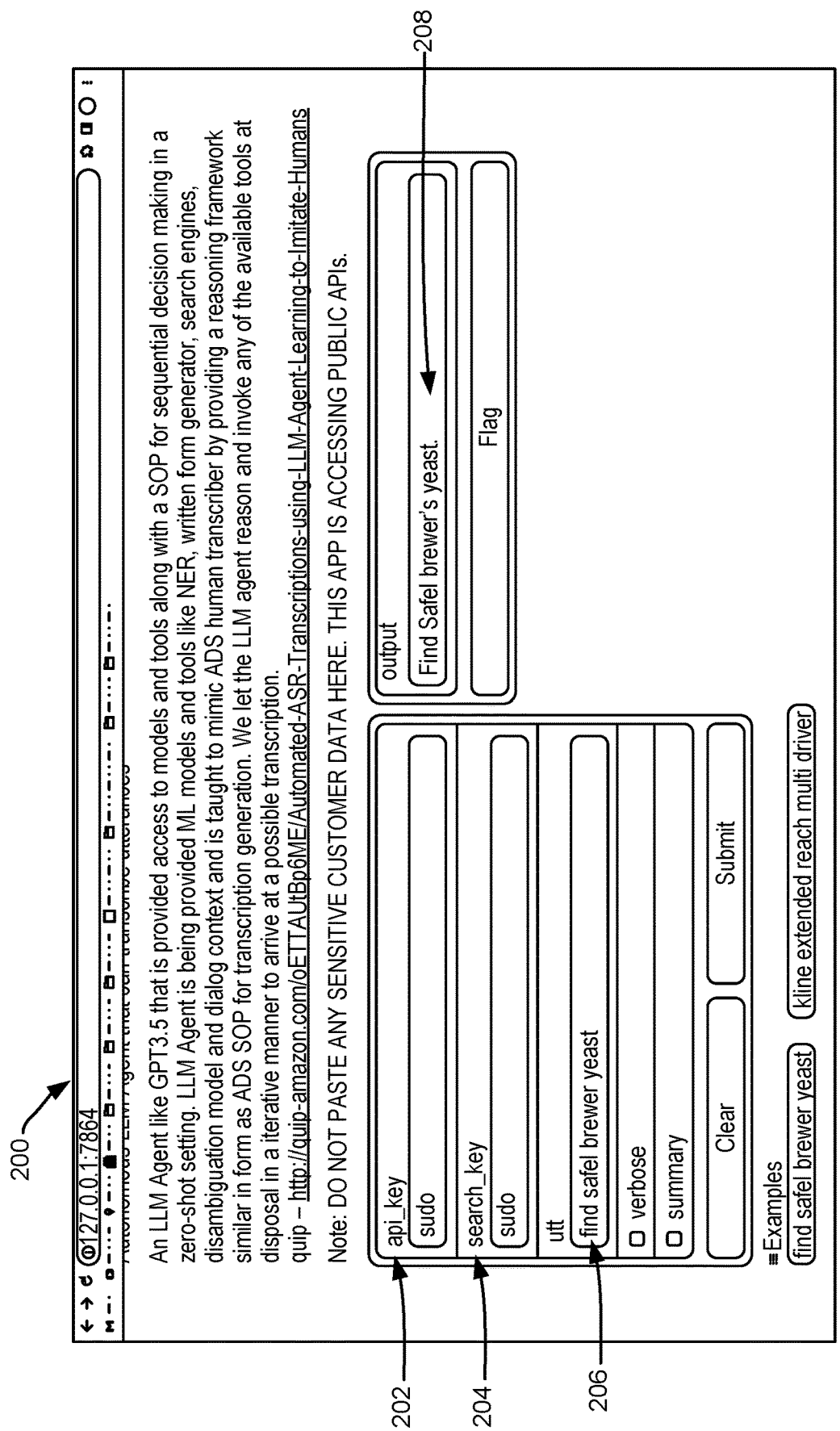
FIG. 2 illustrates an example of a user interface in accordance with an embodiment of the disclosure.

FIG. 2 illustrates an example of a user interface 200 in accordance with an embodiment of the disclosure. The user interface 200 is a graphical user interface including multiple fields that display information related to processing a user input to perform a task. For instance, a first field 202 of the user interface 200 provides an area where an application programming interface (API) key for performing the task can be defined. In addition, the user interface 200 includes a second field 204 that provides an area where a search key for performing the task is defined. For instance, the first field 202 and the second field 204 indicate that particular permissions are to be used.

The user interface 200 also includes a third field 206 for indicating text that is output by an ASR process. The text is associated with user-provided information received as part of user input requesting the task be performed. As illustrated, the text is "find safel brewer yeast". The text includes an entity identifier of "safel brewer yeast". Upon a user interacting with a feature (e.g., submit button) of the user interface 200, an LLM (e.g., LLM 122 in FIG. 1) uses various tools to generate, within a short amount of time (e.g., in real-time relative to the input being received or within a few seconds depending on the use case) an output, which is displayed in a fourth field 208 of the user interface 200. For instance, the LLM may access an error detection model to determine that there is an error with the entity identifier in the text and a search engine to determine that the correct entity identifier is "Safale brewer's yeast". As a result, the user interface 200 displays "Find Safale brewer's yeast" in the fourth field 208.

Figure 3:
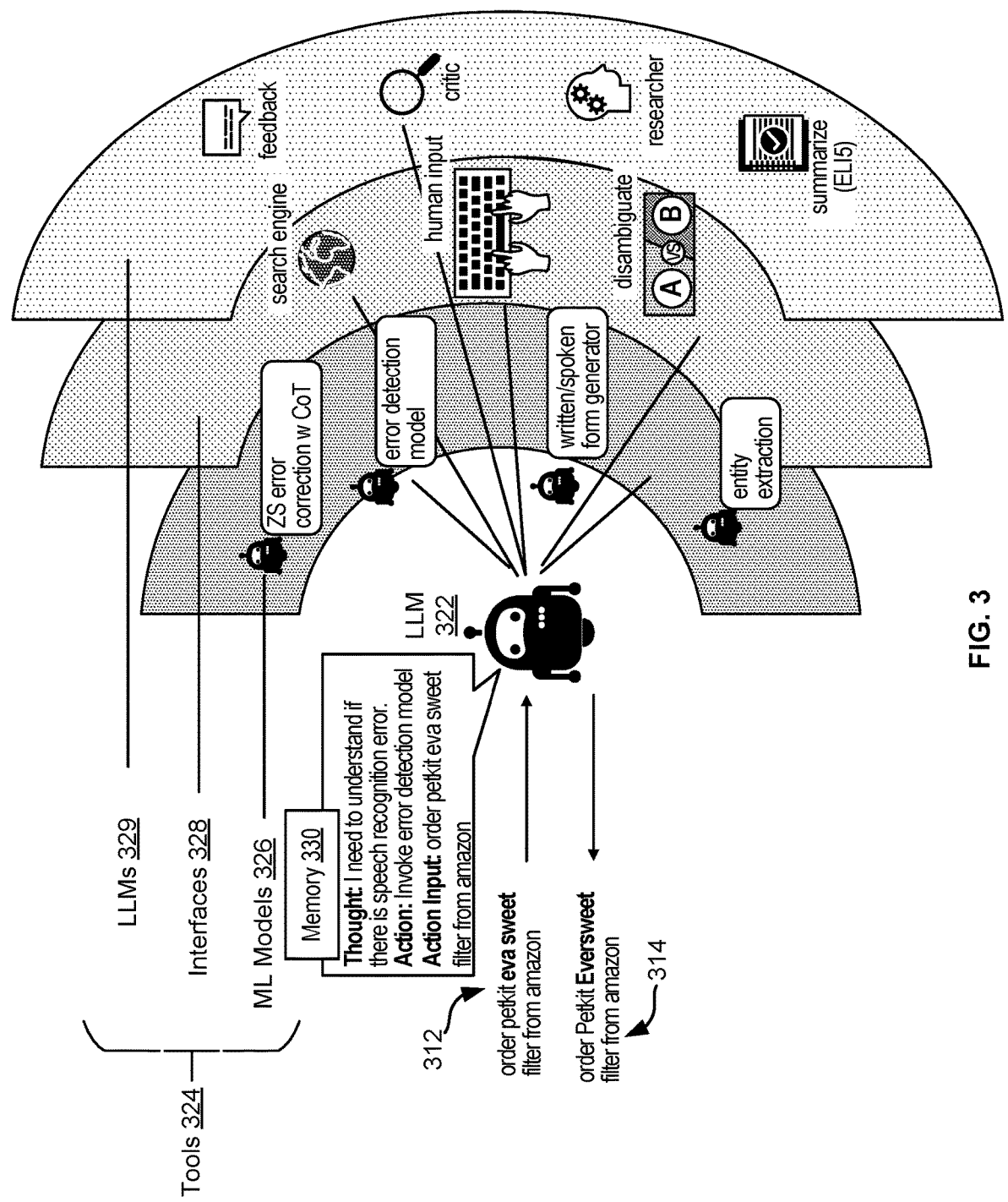
FIG. 3 illustrates an example of tools for large language model-based correction in accordance with an embodiment of the disclosure.

FIG. 3 illustrates an example of tools 324 for LLM-based correction in accordance with an embodiment of the disclosure. An LLM 322, which is an example of the LLM 122 in FIG. 1, receives a user input 312 including user-provided information and indicating a request for a task to be performed on the user-provided information. The user-provided input may include text output by an ASR process that includes an entity identifier. For instance, in the example shown in FIG. 3, the text is "order petkit eva sweet filter from amazon". The LLM 322 is associated with a prompt indicating a sequence of steps to perform for the task, the tools 324 that are available to the LLM 322, and an execution format for the steps.

In an example, the tools 324 include ML models 326, interfaces 328, and LLMs 329. The ML models 326 include an error correction model for correcting errors in text, an error detection model for identifying errors in text, a written form generator for converting the text to written form, and an entity extraction model for identifying an entity identifier in text. The interfaces 328 can include a web interface to a search engine for looking up an entity identifier, a user interface for requesting and receiving user input about text, and a disambiguation interface for disambiguating between entity identifiers. The LLMs 329 may be referred to as meta-agents that critique, provide feedback, provide research, or summarize results generated by the LLM 322 to help the LLM 322 learn and improve.

In an example, the LLM 322 can receive the user input 312 and generate an input to a first tool of the tools 324 based on the user input 312. The first tool can correspond to a first step of the sequence of steps and the input can be based on an execution format for the first step. In general, the execution format can indicate a procedure that includes a question to be answered, a thought about a next step, an action (e.g., tool name) to take based on the tools 334, an action input to generate, and an observation to generate as a result of the action. In addition, the execution format may indicate a number of times the procedure can be repeated and a final answer to generate and present upon a determination of a correctness of the final answer. As a particular example, the first tool may be one of the ML models 326, such as the error detection model. The LLM 322 may send an API call including the input via an API to the first tool (e.g., the error detection model). The LLM 322 determines an output of the first tool in response to the input. For instance, the output may indicate that there is an error associated with the entity-identifier included in the text based on an API response of the error detection model.

Based on this output, the LLM 322 determines whether the task is complete. If the LLM 322 determines that the task is complete, the LLM 322 can forgo execution of a next step indicated by the prompt. Alternatively, if the LLM 322 determines that the task is not complete, the LLM 322 can perform another step of the sequence. As such, the LLM 322 generates a second input to a second tool. The second input is generated based on the output of the first tool. For instance, the LLM 322 knows the format of the output of the first tool and the needed format of the second input. So, the LLM 322 translates between the two formats to generate the second input. In the particular example, the second tool may be one of the interfaces 328, such as the search engine. The LLM 322 may send a search request including the second input via a web interface to the second tool (e.g., the search engine). The LLM 322 determines a second output of the second tool in response to the second input. For instance, the second output may indicate that the entity-identifier should be "Petkit Eversweet filter" based on a search result of the search engine.

The LLM 322 may determine a completion of the task after performing the second step, or the LLM 322 may perform additional steps before determining a completion of the task. In any case, upon determining the completion of the task, the LLM 322 can determine an update to the user-provided information based on the most-recent output (e.g., the second output). In the particular example, the update can include a correction to the entity identifier. The LLM 322 can cause the update to be presented at a user interface. For instance, a response 314 of "order Petkit Eversweet filter from amazon" may be presented.

In an example, the LLM 322 may perform a third step before determining the completion of the task. To perform the third step, the LLM 322 may generate a third input to a third tool based on the second output by translating the second input into a format needed for the third input. In the particular example, the third tool may be another one of the interfaces 328, such as a user interface for requesting another user input. The LLM 322 may send a request including the third input to a device and receive the other user input in response via the user interface of the third tool. The request may be a user validation that the entity identifier should be "Petkit Eversweet filter". The LLM 322 determines a third output of the third tool in response to the third input. For instance, the third output may indicate that the entity-identifier should be "Petkit Eversweet filter" based on the other critic researcher LLM, and an input can be provided by the LLM 322 to the critic LLM. The input may include the input to the first tool, the first output, the second input, the second output, and the update. The LLM 322 can then receive reinforcement information from the critic LLM based on the input.

In an example, the LLM 322 can store task-related data in a memory 330 accessible to the LLM 322. The task-related data can include the user input 312, any of the inputs to the tools 324, and the determined output. The task may be re-performed based on the task-related data stored in the memory 330. For instance, the memory 330 may be a memory cache, and the LLM 322 may receive another user input requesting for the task to be performed again (e.g., determining whether "order petkit eva sweet filter from amazon" is correct). The LLM 322 can determine whether a response to the user input is available from the memory cache. The LLM 322 can look for an entry in the memory cache for the other user input. The entry may be the text previously processed by the LLM 322, a hash of text previously processed, etc. If the response is not available from the memory cache, the LLM 322 can perform the task based on the new user input. Alternatively, if the response is available from the memory cache, the response including the update can be generated from the task-related data. In addition, the LLM 322 can forgo performing the task again in response to the new input.

The LLM 322 may provide an input to another one of the LLMs 329, such as the critic LLM, that includes the task-related data stored in the memory 330. The LLM 322 can then receive reinforcement information from the critic LLM based on the input that can improve task execution of the LLM 322.

Figure 4:
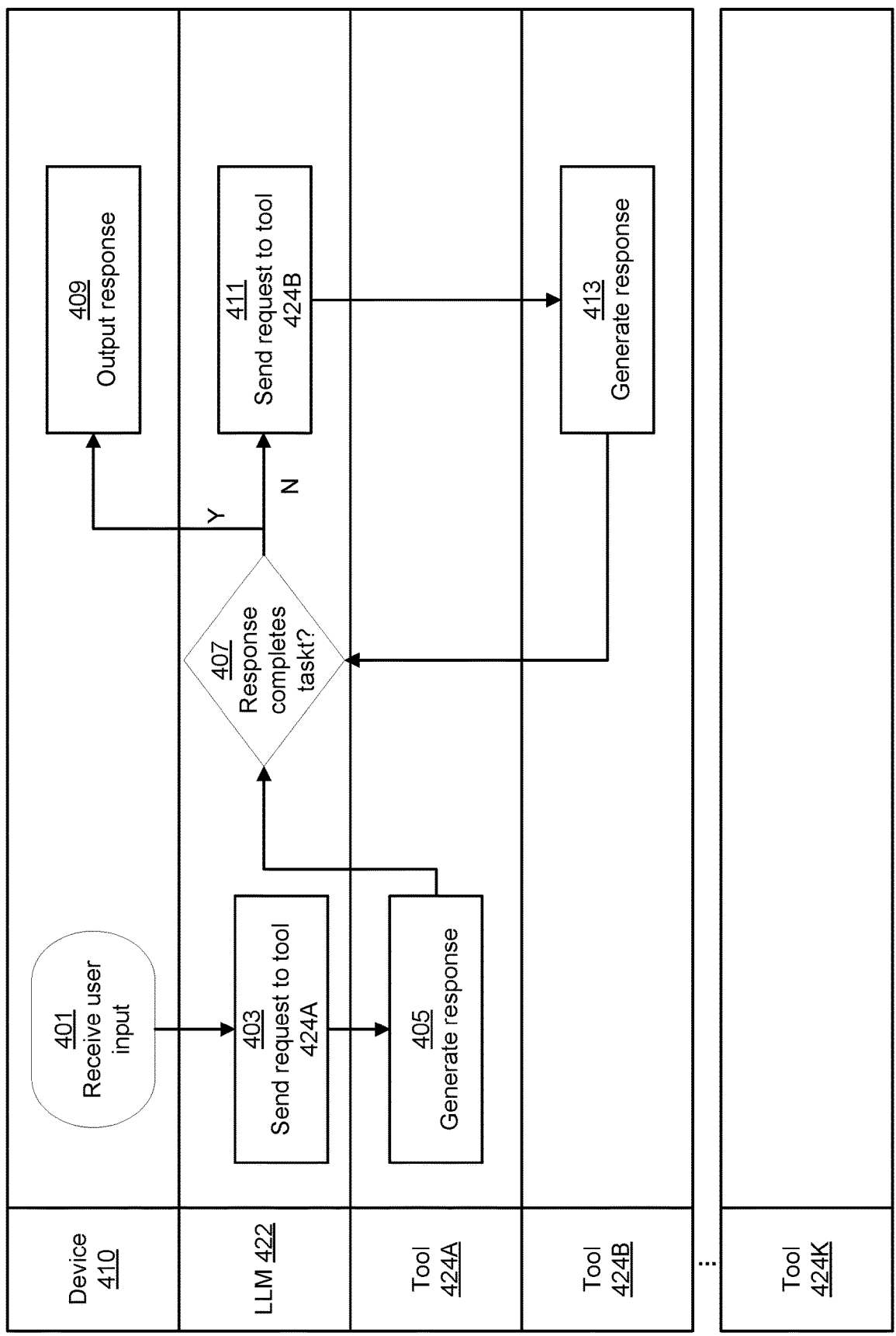
FIG. 4 illustrates a swim lane diagram of large language model-based correction based on a multi-tool prompt in accordance with an embodiment of the disclosure.

FIG. 4 illustrates a swim lane diagram of LLM-based correction based on a multi-tool prompt in accordance with an embodiment of the disclosure. Operations of the swim lane diagram can be performed by a device 410 (e.g., user device 110 in FIG. 1), an LLM 422 (e.g., LLM 122 in FIG. 1), and tools 424A-424K.

In operation 401, the device 410 receives a user input. The user input can include user-provided information as text that is output by an ASR process. The text can include an entity identifier. For instance, the text may be "buy riding pins". Other inputs are possible as described herein above and include any or a combination of audio, image, video, etc.

In operation 403, the LLM 422 sends a request to a tool 424A. Here, the LLM 422 determines the task to be performed (e.g., text verification or text correction). Given the prompt, the LLM 422 determines the first step to be executed, the tool to be used (e.g., the tool 424A), and the execution format (e.g., the format of the input to the tool, the excepted format of the output of the tool, etc.). The request includes an input to the tool 424A that is generated by the LLM 422 based on the user input (e.g., the LLM 422 can reformat the user input into the target format of the input to the tool 424A as indicated by the prompt). The tool 424A may be an error detection ML model and the request can be sent as an API call via an API to the tool 424A.

In operation 405, the tool 424A generates a response. The tool 424A generates the response based on the input. For instance, the response may be an indication that the user input includes an error. Or the response may indicate that the user input does not include an error. The format of the response can be according to the execution format indicated by the prompt for that tool. As such, the LLM 422 can further process the response.

In operation 407, the LLM 422 determines whether the response completes the task. This determination can be based on the LLM 422 understanding of the response and its prediction, given the understanding, of whether this response completes the task (e.g., answers the question that was asked: does the text include an error and the error was corrected). The prediction can be quantified as a likelihood and can be compared to a predefined threshold. Exceeding the threshold indicates a high confidence that the response completes the task (e.g., text includes no error, or task includes error and error is corrected). Otherwise, a low confidence is determined. If the response indicates that the task is complete (e.g., high confidence), the LLM 422 can proceed to operation 411. If the response indicates that the task is incomplete (e.g., low confidence, the LLM 422 proceed to operation 409.

In operation 409, the device 410 outputs the response. The response can indicate that the user input is ready for downstream processing by a downstream computer system (e.g., the device 410 is a smart speaker and the LLM 422 is deployed for real-time correction of an ASR output from audio detected by the smart speaker before natural language understanding is applied to such an output; training data for a machine learning model used in association with an online marketplace, etc.).

In operation 411, the LLM 422 sends a request to a tool 424B. Here, given that the execution of the first step (which may be repeated in a same way or using different ways by, for example, changing the format as indicated by the prompt) did not result in the completion of the task, the LLM 422 determines the next step to execute according to the prompt. The prompt also indicates the next tool (e.g., the tool 424B) and the execution format such that the LLM can properly execute this next step. According to the prompt, the LLM 422 can re-format the user input and/or the response of the tool(s) from the previous step(s) (e.g., the response of the tool 424A in this illustrative example) to an input of the next tool(s) (e.g., the tool 424B). The tool 424B may be a search engine and the request can be sent via a web interface to the search engine.

Although a single tool is illustrated as being used in a single step, the prompt may indicate that multiple tools may be used and the LLM 422 may execute the step accordingly by generating inputs and invoking such tools. Further, although each step is described as being repeated one, the prompt may indicate that each step is to be repeated a number of times in case the tool response(s) at that step does not complete the task. Each time the step is repeated, the prompt can indicate a change to at least one of the execution parameters, such as by using a different set of tools, by using a different set of inputs, and/or by using a different set of execution formats.

In operation 413, the tool 424B generates a response. The tool 424B generates the response based on the input. For instance, the response may be an indication that the entity identifier should be "writing pens". The flow may return to operation 407, where the LLM 422 can then determine whether the response completes the task. If so, the flow can proceed to operation 409. Otherwise, the LLM 422 can continue determining the next step and next tool(s) to use according to the prompt until determining that the task is complete.

Figure 5:
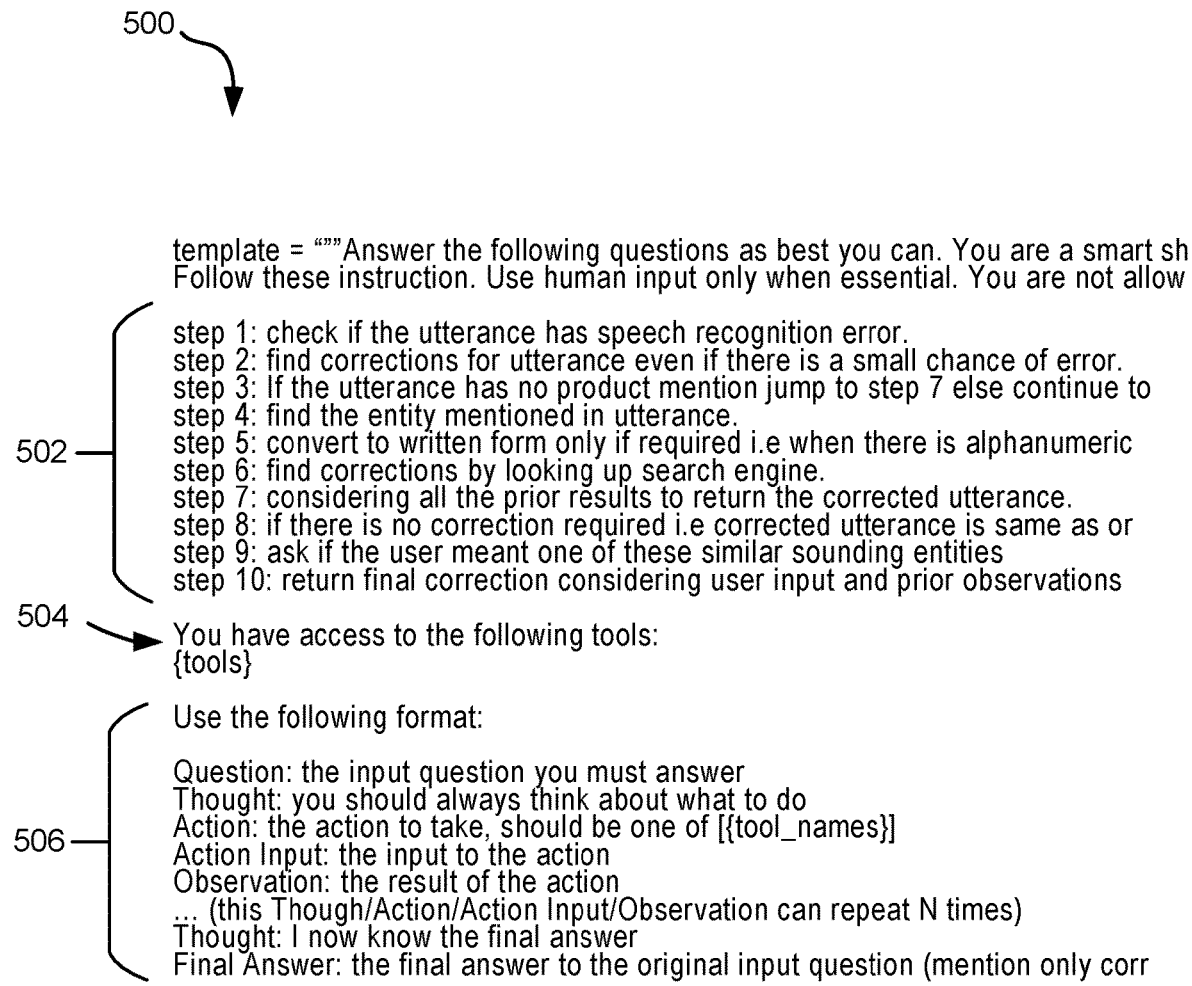
FIG. 5 illustrates an example of a prompt for performing a task in accordance with an embodiment of the disclosure.

FIG. 5 illustrates an example of a prompt 500 for performing a task in accordance with an embodiment of the disclosure. The prompt 500 includes an indication of a sequence of steps 502 to perform for the task and an indication of the tools available to an LLM (e.g., LLM 122 in FIG. 1). This indication can be per step or collective to all steps (in the latter case, the LLM can determine the relevant tool to use based on the step to execute). The prompt 500 also includes an execution format 506. Here also, the execution format can for each step (e.g., the format can change between steps or tools) or can be collective to all steps.

In FIG. 5, the prompt 500 is associated with a text verification task. So, the sequence of steps 502 involves: step 1) checking whether the text of the user input 112 has a speech recognition error, step 2) finding corrections for the text even if there is a small chance of error, step 3) proceeding to step 7 if no entity identifier is included in the text, step 4) finding the entity mentioned in the text, step 5) converting the text to written form when required, step 6) determining corrections by looking up a search engine, step 7) considering all the prior results to return corrected text, step 8) if no correction is needed, proceed to step 10, step 9) ask if a user meant one of these similar sounding entities, and step 10) return a final correction considering user input and prior observations. Although the indication of the tools 504 does not show any tool names, the indication of the tools 504 may show any or all of the tools 324 in FIG. 3 or any additional tools.

The execution format 506 indicates a format to execute a step. The format defines different parameters for the execution. For example, the format indicates a question to be answered, a thought about a next step, an action to take based on the tool(s), an action input to generate, and an observation to generate as a result of the action. In addition, the execution format 506 indicates a number of times the procedure can be repeated, and a final answer to generate and present upon determination of a correctness of the final answer.

Figure 6:
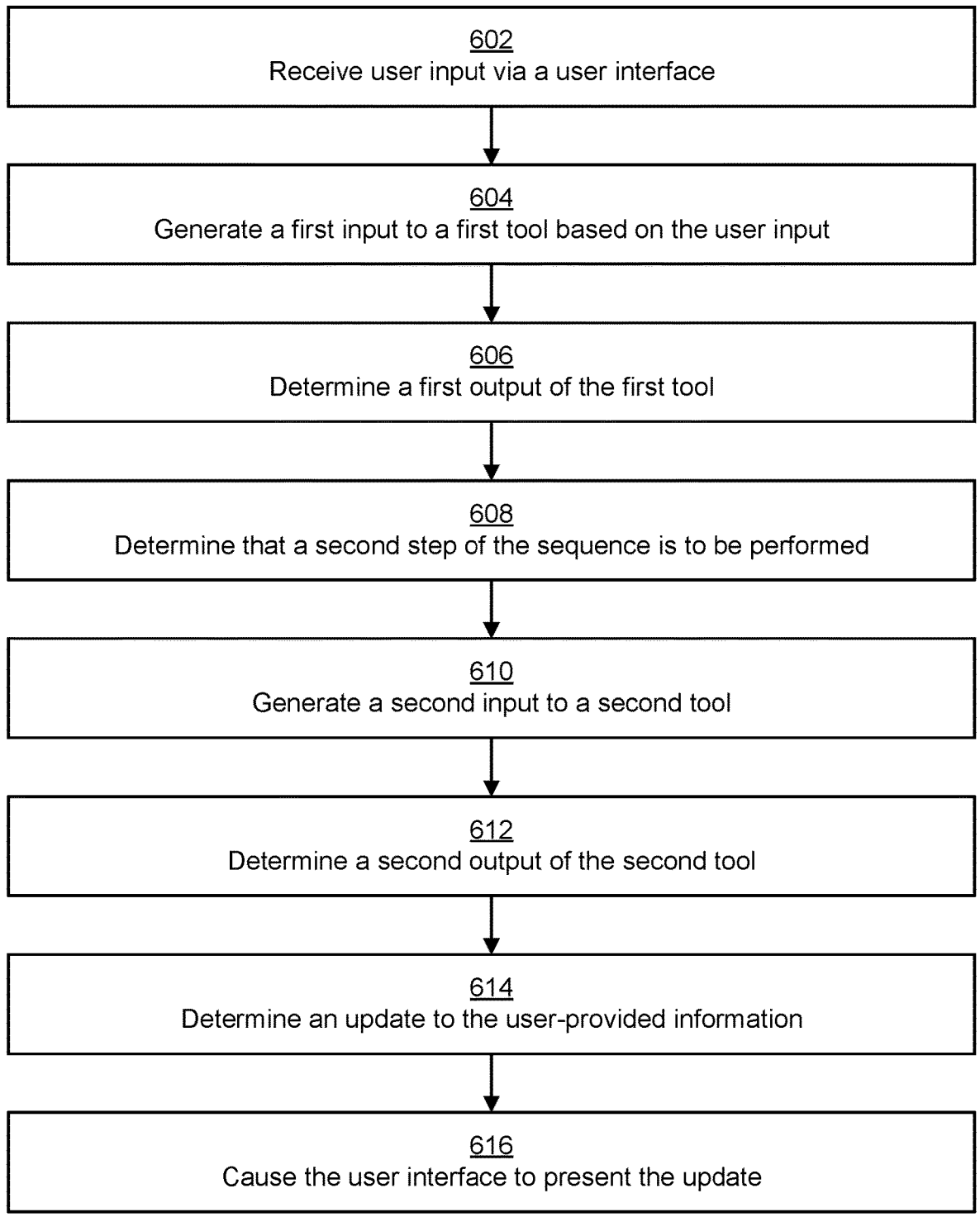
FIG. 6 illustrates an example flow of a process for using a large language model to correct a user input in accordance with an embodiment of the disclosure.
Figure 7:
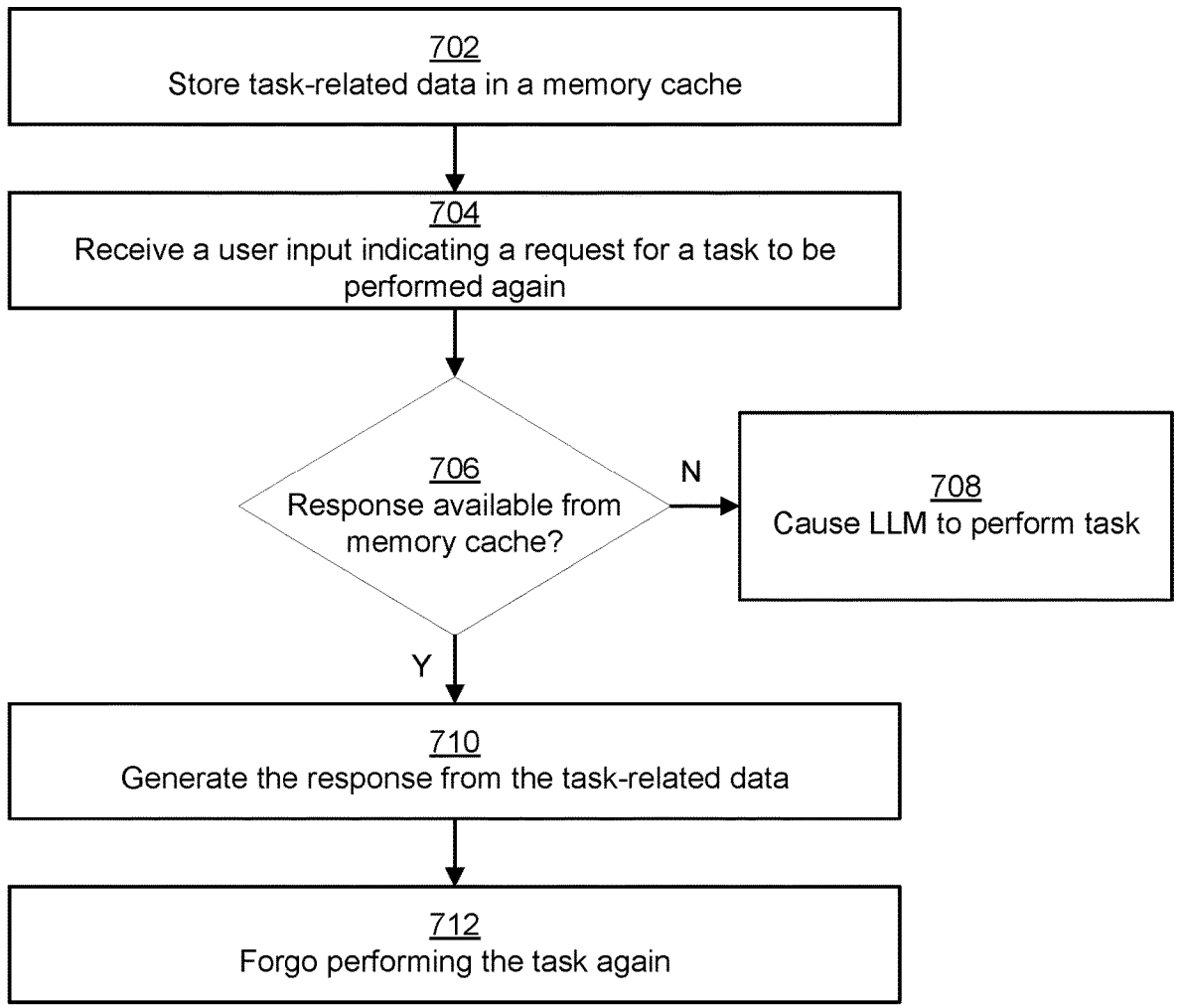
FIG. 7 illustrates an example flow of a process for using a memory of a large language model to perform tasks in accordance with an embodiment of the disclosure.

FIGS. 6-7 illustrate example flows related to LLM-based correction based on a multi-tool prompt in accordance with an embodiment of the disclosure. Operations of the flows can be performed by a computer system, such as the computer system 120 in FIG. 1. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 6 illustrates an example flow of a process for using an LLM to correct a user input in accordance with an embodiment of the disclosure. In an example, the flow includes operation 602, where the computer system receives user input via a user interface. The user input includes user-provided information and indicates a request for a task to be performed on the user-provided information. The task may involve text verification or text correction. The user-provided information can include text that is output by an ASR process that includes an entity identifier (e.g., product).

In an example, the flow includes operation 604, where the computer system generates a first input to a first tool based on the user input. The computer system can use an LLM associated with a prompt to generate the first input. The prompt can indicate a sequence of steps to perform for the task, tools available to the LLM, and an execution format for each step. The first tool can correspond to a first step of the sequence of steps and the first input can be based on a first execution format for the first step.

In an example, the flow includes operation 606, where the computer system determines a first output of the first tool. The first output is determined by using the LLM in response to the first input. For instance, the first tool may be an ML model and the first output can be determined based on an API response of the ML model.

In an example, the flow includes operation 608, where the computer system determines that a second step of the sequence is to be performed. The computer system determines that the first output is not associated with a completion of the task, so a next step (e.g., the second step) is to be performed.

In an example, the flow includes operation 610, where the computer system generates a second input to a second tool. The second input is based on the first output. The second tool can correspond to the second step and the second input can be based on a second execution format for the second step. The second execution format may be the same as or different from the first execution format.

In an example, the flow includes operation 612, where the computer system determines a second output of the second tool. The second output is determined by the LLM in response to the second input. The second tool may be a search engine and the second output may be a search result of the search engine.

In an example, the flow includes operation 614, where the computer system determines an update to the user-provided information. The computer system can determine the update based on the second output and a completion of the task. In some instances, the update can be determined based on outputs of additional steps in the sequence of steps. The update can include a correction to the first entity identifier.

In an example, the flow includes operation 616, where the computer system causes the user interface to present the update. The update can be presented by replacing the first entity identifier with the corrected first entity identifier, or the update may be presented as a suggestion for the first entity identifier.

FIG. 7 illustrates an example flow of a process for using an LLM to correct a user input in accordance with an embodiment of the disclosure. In an example, the flow includes operation 702, where the computer system stores task-related data in a memory cache. The task-related data previous user inputs indicating requests for tasks that were performed on user-provided information included in the user inputs. The task-related data can also include inputs to tools that were generated for the user input, outputs from the tools, and determined updates to the user-provided information.

In an example, the flow includes operation 704, where the computer system receives a user input indicating a request for a task to be performed again. The user input may or may not be the same or similar to a previous user input.

In an example, the flow includes operation 706, where the computer system determines whether a response is available from the memory cache. The computer system can look up the memory cache to determine whether an entry in the memory cache is associated with the user input. If the response is not available from the memory cache, the computer system can proceed to operation 708. Otherwise, the computer system can proceed to operation 710.

In an example, the flow includes operation 708, where the computer system causes the LLM to perform the task. Since the response is not available in the memory cache, the computer system can use the LLM to generate inputs to one or more tools to generate outputs until the LLM determines that the task is complete. An input to a first tool can be generated based on the user input and inputs to subsequent tasks can be generated based on the output of the previous tool. Once the LLM determines that the task is complete, the LLM can determine an update to the user-provided information and cause a user interface to present the update.

In an example, the flow includes operation 710, where the computer system generates the response from the task-related data. The response can be retrieved from the memory cache and can include the update to the user-provided information.

In an example, the flow includes operation 712, where the computer system forgoes performing the task again. The computer system does not need to re-process the user input by performing the task again since the response is available in the memory cache.

Figure 8:
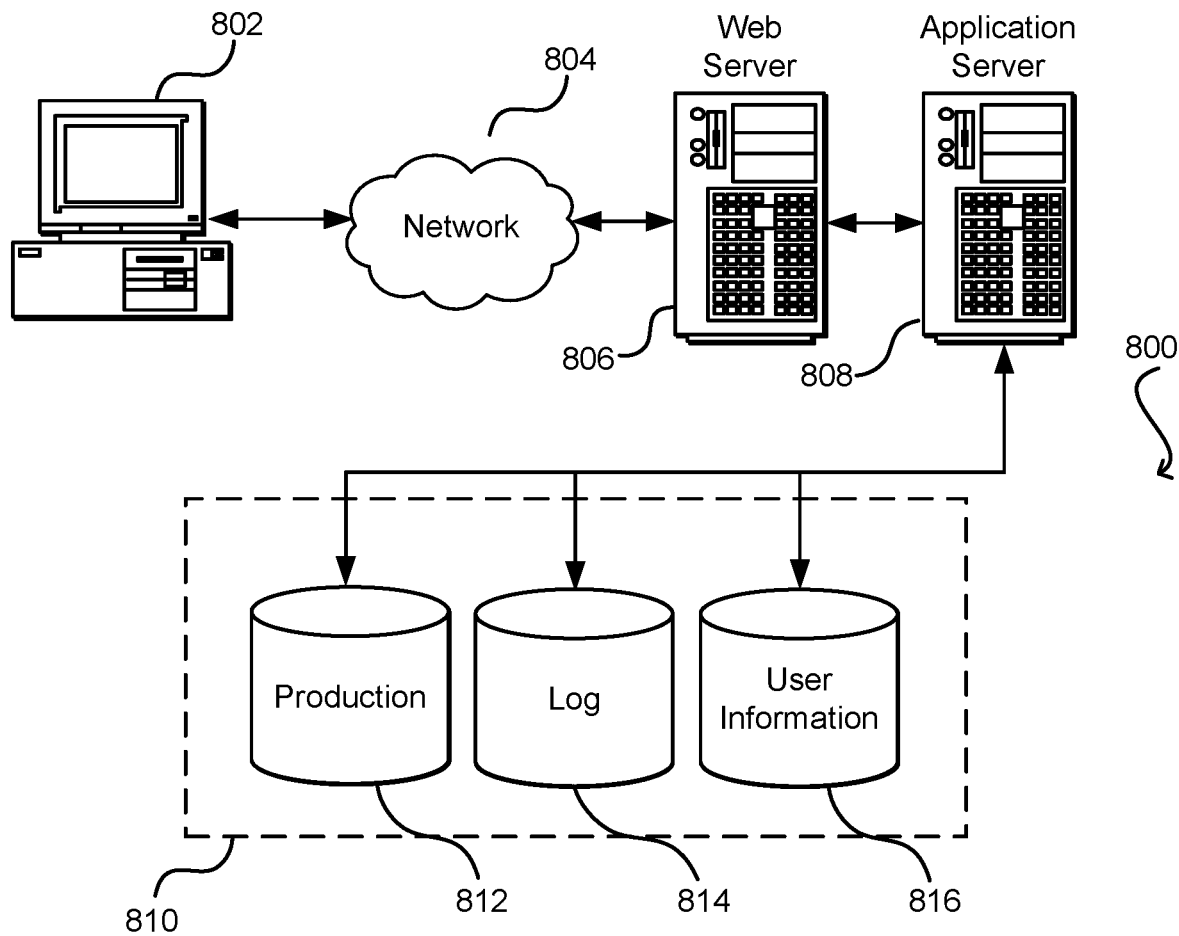
FIG. 8 illustrates aspects of an example environment for implementing aspects in accordance with various embodiments.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802 (such as any of the devices described herein above), which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    receiving, via a user interface, user input including user-provided information and indicating a request for a task to be performed on the user-provided information, the task comprising text correction, the user-provided information comprising text that is output by an automatic speech recognition (ASR) process and that includes a first entity identifier;
    generating, by using a large language model associated with a prompt, a first input to a first tool based at least in part on the user input, the prompt indicating a sequence of steps to perform for the task, a plurality of tools available to the large language model, and an execution format for each step, the first tool corresponding to a first step of the sequence of steps, the first input being based at least in part on a first execution format for the first step;
    determining, by using the large language model, a first output of the first tool in response to the first input;
    determining, by using the large language model, that a second step of the sequence is to be performed based at least in part on the first output;
    generating, by using the large language model, a second input to a second tool based at least in part on the first output, the second tool corresponding to the second step, the second input being based at least in part on a second execution format for the second step;
    determining, by using the large language model, a second output of the second tool in response to the second input;
    determining, by using the large language model, an update to the user-provided information based at least in part on the second output and a completion of the task, the update comprising a correction to the first entity identifier; and
    causing the user interface to present the update.

2. The computer-implemented method of claim 1, further comprising:
sending, by using the large language model, an application programming interface (API) call via an API to the first tool, wherein the API call includes the first input, wherein the first tool comprises a machine learning model, and wherein the first output is determined based at least in part on an API response of the machine learning model; and
sending, by using the large language model, a search request via a web interface to the second tool, wherein the search request includes the second input, wherein the second tool comprises a search engine, and wherein the second output is determined based at least in part on a search result of the search engine.

3. The computer-implemented method of claim 1, further comprising:
determining, by using the large language model, that performing the task is incomplete based at least in part on the second output;
generating, by using the large language model, a third input to a third tool based at least in part on the second output, the third tool corresponding to a third step, the third input being based at least in part on a third execution format for the third step;
determining, by using the large language model, a third output of the third tool in response to the third input, the third output corresponding to different user input via a different user interface; and
determining, by using the large language model, the completion of the task based at least in part on the third output, wherein the update is generated based at least in part on the third output.

4. The computer-implemented method of claim 1, further comprising:
providing, by using the large language model, a third input to a different large language model, wherein the third input includes the user input, the first input, the first output, the second input, the second output, and the update; and
receiving reinforcement information from the different large language model based at least in part on the third input.

5. A system comprising:
one or more processors; and
one or more memory storing instructions that, upon execution by the one or more processors, configure the system to:
receive, via a user interface, user input including user-provided information and indicating a request for a task to be performed on the user-provided information;
generate, by using a large language model associated with a prompt, a first input to a first tool based at least in part on the user input, the prompt indicating a sequence of steps to perform for the task and a plurality of tools available to the large language model, the first tool corresponding to a first step of the sequence of steps;
determine, by using the large language model, a first output of the first tool in response to the first input;
determine, by using the large language model, an update to the user-provided information based at least in part on the first output and a completion of the task; and
cause the user interface to present the update.

6. The system of claim 5, wherein the task comprises text verification, wherein the user-provided information comprises text that is output by an automatic speech recognition (ASR) process and that includes a first entity identifier, and wherein the update comprises a correction to the first entity identifier.

7. The system of claim 5, wherein the prompt further indicates an execution format for the first step.

8. The system of claim 7, wherein the execution format indicates procedure that includes a question to be answered, a thought about a next step, an action to take based at least in part on the plurality of tools, an action input to generate, and an observation to generate as a result of the action.

9. The system of claim 8, wherein the execution format indicates a number of times the procedure can be repeated, and a final answer to generate and present upon determination of a correctness of the final answer.

10. The system of claim 5, wherein the one or more memory store further instructions that, upon execution by the one or more processors, further configure the system to:
determine, by using the large language model, that a second step of the sequence is to be performed based at least in part on the first output;
generate, by using the large language model, a second input to a second tool based at least in part on the first output, the second tool corresponding to the second step, the second input being based at least in part on a second execution format for the second step; and
determine, by using the large language model, a second output of the second tool in response to the second input, wherein the update is further based at least in part on the second output.

11. The system of claim 10, wherein the one or more memory store additional instructions that, upon execution by the one or more processors, further configure the system to:
determine, by using the large language model, that performing the task is incomplete based at least in part on the first output, wherein a determination that the second step is to be performed is based at least in part on the performing being incomplete.

12. The system of claim 5, wherein the one or more memory store further instructions that, upon execution by the one or more processors, further configure the system to:
determine, by using the large language model, that performing the task is complete based at least in part on the first output; and
forego execution of a next step indicated by the prompt based at least in part on the performing being complete.

13. One or more non-transitory computer-readable storage media storing instructions that, upon execution on a system, cause the system to perform operations comprising:
receiving, via a user interface, user input including user-provided information and indicating a request for a task to be performed on the user-provided information;
generating, by using a large language model associated with a prompt, a first input to a first tool based at least in part on the user input, the prompt indicating a sequence of steps to perform for the task and a plurality of tools available to the large language model, the first tool corresponding to a first step of the sequence of steps;
determining, by using the large language model, a first output of the first tool in response to the first input;
determining, by using the large language model, an update to the user-provided information based at least in part on the first output and a completion of the task; and causing the user interface to present the update.

14. The one or more non-transitory computer-readable storage media of claim 13, wherein the operations further comprise:

storing task-related data in a memory accessible to the large language model, wherein the task-related data comprises the user input, the first input, the first output, and the update, wherein re-performing the task is based at least in part on the task-related data stored in the memory.

15. The one or more non-transitory computer-readable storage media of claim 13, wherein the user input and the request are a first user input and a first request, respectively, and wherein the operations further comprise:

storing task-related data in a memory cache;

receiving, a second user input indicating a second request for the task to be performed again; and determining whether a response to the second user input is available from the memory cache.

16. The one or more non-transitory computer-readable storage media of claim 15, wherein the operations further comprise:

causing, based at least in part on the response being unavailable from the memory cache, the large language model to perform the task based at least in part on the second user input.

17. The one or more non-transitory computer-readable storage media of claim 15, wherein the operations further comprise:

generating, based at least in part on the response being available from the memory cache, the response from the task-related data, wherein the response includes the update; and foregoing performing the task again in response to the second user input.

18. The one or more non-transitory computer-readable storage media of claim 13, wherein the operations further comprise:

storing task-related data in a memory accessible to the large language model;

providing, by using the large language model, a second input to a different large language model, wherein the second input includes the task-related data; and receiving reinforcement information from the different large language model based at least in part on the second input.

19. The one or more non-transitory computer-readable storage media of claim 13, wherein the operations further comprise:

generating, by using the large language model, a second input to a second tool based at least in part on the first output, the second tool corresponding to a second step of the sequence of steps, the second input being based at least in part on a second execution format for the second step; and determining, by using the large language model, a second output of the second tool in response to the second input, wherein the update is further based at least in part on the second output.

20. The one or more non-transitory computer-readable storage media of claim 19, wherein the operations further comprise:

sending, by using the large language model, an application programming interface (API) call via an API to the first tool, wherein the API call includes the first input, and wherein the first output is determined based at least in part on an API response of the first tool; and sending, by using the large language model, an output request via a web interface to the second tool, wherein the output request includes the second input, and wherein the second output is determined based at least in part on a response of the second tool.

* * * * *